United States Patent Office 3,399,235
Patented Aug. 27, 1968

3,399,235
POLYNITRO TRIFLUOROMETHYL AMINES
Milton B. Frankel, Menlo Park, Calif., assignor to Aerojet-General Corporation, Azusa, Calif., a corporation of Ohio
No Drawing. Original application June 8, 1964, Ser. No. 374,234, now Patent No. 3,228,929, dated Jan. 11, 1966. Divided and this application Sept. 8, 1965, Ser. No. 529,622
5 Claims. (Cl. 260—583)

ABSTRACT OF THE DISCLOSURE

Compounds of the formula

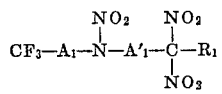

wherein $A_1$ and $A'_1$ are lower alkylene radicals, and $R_1$ is selected from the group consisting of nitro and lower alkyl. These compounds are prepared by reacting novel compounds of the formula

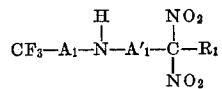

with a strong nitrating agent, wherein in the above formulae, $A_1$ and $A'_1$ and $R_1$ are defined as above. The fluorine-containing starting material is prepared by reacting amine compounds of the formula

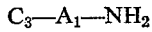

with an alkanol of the formula

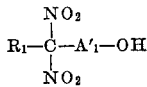

These compounds are inherently useful as explosives.

---

This application is a divisional application of Ser. No. 374,234, filed June 8, 1964 now U.S. Patent No. 3,228,929.

This invention pertains to a novel class of compounds containing a plurality of nitro groups, and to their method of preparation.

It is an object of the present invention to provide a group of novel polynitro compounds.

Another object of the present invention is to prepare a novel class of compounds which are especially useful in explosives.

Still another object of the present invention is to provide new synthesis techniques in the preparation of polynitro compounds.

These and other objects of my invention will be apparent from the detailed description which follows.

The polynitro compounds of the present invention are those containing the trifluoromethyl group and having the general formula:

(I) 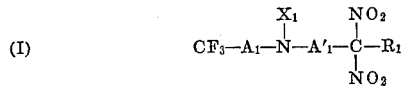

wherein $X_1$ is selected from the group consisting of hydrogen and nitro, $A_1$ and $A'_1$ are lower alkylene, and $R_1$ is selected from the group consisting of nitro and lower alkyl. In the above formula when $R_1$ is lower alkyl, the group normally contains from 1 to about 6 carbon atoms such as methyl, ethyl, isopropyl and hexyl. The lower alkylene groups, $A_1$ and $A'_1$ normally contain up to about 6 carbons. Typical of these alkylene groups are methylene, ethylene and hexamethylene.

The compounds of the above formula wherein $X_1$ is hydrogen are prepared in accordance with the following general reaction equation:

(II) 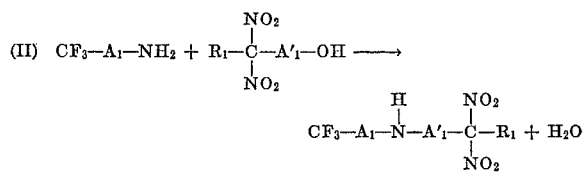

wherein $R_1$, $A_1$ and $A'_1$ are as defined above in Formula I.

The compounds of Formula I wherein $X_1$ is nitro, are prepared by reacting the product of Reaction II with a strong nitrating agent, as shown in the following reaction equation where nitric acid is the nitrating agent:

(III) 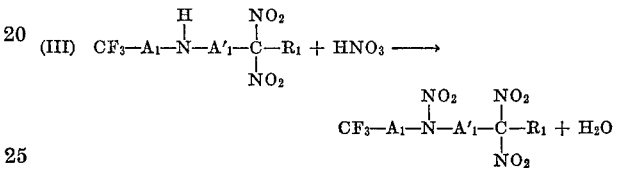

wherein $R_1$, $A_1$ and $A'_1$ are as previously defined.

In Reaction II above, the free amine may be used or, alternatively, the amine hydrohalide, with the amine hydrochloride being preferred. Reaction II is ordinarily carried out in the presence of an inert polar solvent such as water or methanol at a temperature from about 20° C. to about 100° C. For best results, both in terms of yield and reaction rate, this reaction is conducted in the presence of a basic material such as sodium hydroxide, potassium hydroxide, calcium hydroxide or sodium acetate. While not critical, the amine and the alcohol reactants are usually employed in about stoichiometric amounts.

The nitration Reaction III is commonly carried out employing concentrated nitric acid at a temperature of from about —20° C. to about +20° C., preferably in the presence of acetic anhydride. Other strong nitrating agents such as nitrogen tetroxide may be used.

The products of Reactions II and III may be isolated in conventional manner such as by extraction, crystallization and/or evaporation.

The following examples illustrate preparation of the compounds of Formula I:

EXAMPLE I

Preparation of 1,1,1-trifluoro-5,5,5-trinitro-3-azapentane

To a solution of 1.36 grams (0.01 mole) of 2,2,2-trifluoroethyl amine hydrochloride, 1.81 grams (0.01 mole) of trinitroethanol and 25 ml. of water was added dropwise a solution of 0.82 gram of sodium acetate in 10 ml. of water. A brown oil separated from the solution. The reaction mixture was extracted with 25 ml. of methylene chloride. The combined extracts were washed with water, dried, and concentrated to give 2.25 grams (85.9 percent) of 1,1,1-trifluoro-5,5,5-trinitro-2-azapentane, $n_D^{27}$ 1.4260.

When the foregoing example is repeated using 3,3,3-trinitropropanol in lieu of 2,2,2-trinitroethanol, 1,1,1-trifluoro-6,6,6-trinitro-3-azahexane is obtained.

EXAMPLE II

Preparation of 1,1,1-trifluoro-3,5,5,5-tetranitro-3-azapentane 1,1,1-trifluoro-5,5,5-trinitro - 3 - azapentane, 2.25 grams (0.0086 mole), was dissolved in 20 ml. of acetic anhydride and added to 20 ml. of 99 percent nitric acid at 0 to 5° C. After stirring for 10 minutes, the solution became cloudy and was poured onto ice. The white solid was collected, washed with water, and dried, 1.7 grams (64.5 percent), M.P. 50 to 55° C. Recrystallization from concentrated nitric acid gave white needles, M.P. 58 to 59° C.

*Analysis.*—Calc'd for $C_4H_4F_3N_5O_8$: C, 15.64; H, 1.31; N, 22.81. Found: C, 15.59; H, 1.32; N, 21.79.

EXAMPLE III

Preparation of 1,1,1-trifluoro-5,5-dinitro-3-azahexane

To a solution of 1.36 grams (0.01 mole) of 2,2,2-trifluoroethyl amine hydrochloride, 1.5 grams (0.01 mole) of 2,2-dinitropropanol, and 25 ml. of water was added dropwise a solution of 0.4 gram (0.01 mole) of sodium hydroxide in 10 ml. of water. A brown oil separated from the solution. The reaction mixture was extracted with 2×25 ml. of methylene chloride. The combined extracts were washed with water, dried, and concentrated to give 2.2 grams of 1,1,1 - trifluoro - 5,5 - dinitro - 3 - azahexane, $n_D^{25}$ 1.4188.

Upon repeating Example V using 4,4,4-trifluorobutyl amine instead of 2,2,2-trifluoroethyl amine hydrochloride, 1,1,1-trifluoro-7,7-dinitro-5-azaoctane is obtained in good yield.

EXAMPLE IV

Preparation of 1,1,1-trifluoro-3,5,5-trinitro-3-azahexane 1,1,1 - trifluoro - 5,5 - dinitro - 3 - azahexane, 2.2 grams (0.0095 mole) was dissolved in 20 ml. of actetic anhydride and added to 20 ml. of 99 percent nitric acid at 0 to 5° C. After stirring for 10 minutes, the mixture was poured onto ice. The white solid was collected, washed with water, and dried, 2.05 grams (77.9 percent), M.P. 81 to 82° C. Recrystallization from concentrated nitric acid raised the melting point to 85 to 87° C.

*Analysis.*—Calc'd for $C_5H_7F_3N_4O_6$: C, 21.75; H, 2.56; N, 20.29. Found: C, 22.16; H, 2.73; N, 20.07.

Some of the properties of the compounds for Examples II and IV are listed in the following table. For comparative purposes, the hydrogen analog of the compound of Example IV (3,5,5,5-tetranitro - 3 - azapentane) is also listed. In comparing the calculated lead block and ballistic mortar values of 1,1,1-trifluoro-3,5,5,5-tetranitro-3-azapentane and 3,5,5,5-tetranitro-3-azapentane, it is seen that 1,1,1-trifluoro-3,5,5,5 - trinitro - 3 - azapentane has a slightly higher lead block value and a correspondingly lower ballistic mortar value. Inasmuch as high explosives containing the general structure:

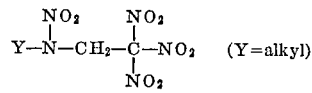

tend to be very sensitive to impact and to possess poor thermal stability, it is especially noteworthy that the impact sensitivity of 1,1,1-trifluoro-3,5,5,5-tetranitro-3-azapentane is greater than 100 cm./2 kg.

TABLE I

| Compound | Impact Sensitivity | Calculated Lead Block Value (TNT=100) | Calculated Ballistic Mortar Value (TNT=100) |
|---|---|---|---|
| $CH_3-CH_2-\underset{}{\overset{NO_2}{N}}-CH_2-\underset{NO_2}{\overset{NO_2}{C}}-NO_2$ (3,5,5,5-tetranitro-3-azapentane) | <50 | 158 | 154 |
| $CF_3-CH_2-\underset{}{\overset{NO_2}{N}}-CH_2-\underset{NO_2}{\overset{NO_2}{C}}-NO_2$ (1,1,1-trifluoro-3,5,5,5-tetranitro-3-azapentane) | >100 | 164 | 146 |
| $CF_3-CH_2-\underset{}{\overset{NO_2}{N}}-CH_2-\underset{NO_2}{\overset{NO_2}{C}}-CH_3$ (1,1,1-trifluoro-3,5,5-trinitro-3-azahexane) | >100 | 113 | 127 |

The impact sensitivity numbers appearing in the table refer to the drop height in centimeters of a 2 kilogram weight at which 50 percent of the trials resulted in an explosion.

The new compounds of my invention, which contain a plurality of nitro groups, are inherently useful as high explosives. These compounds can also be used in any conventional explosive missile, projectile, rocket, or the like, as the main explosive charge. An example of such a missile is disclosed in United States Patent 2,470,162, issued May 17, 1949. One way of using these high explosive compounds in a device, such as disclosed in United States Patent 2,470,162, is to pack the explosive in powder form into the warhead of the missile. Alternatively, the compound may be first pelletized and then packed. The liquid compounds can be first absorbed on cotton or sawdust, and then compacted. A charge thus prepared is sufficiently insensitive to withstand the shock entailed in the ejection of a shell from a gun barrel or a rocket launching tube under the pressure developed from ignition of a propellant charge and can be caused to explode on the operation of an impact or time-fuse mechanism firing a detonating explosive such as lead azide or mercury fulminate.

It will be understood that various modifications may be made in this invention without departing from the spirit thereof or the scope of the appended claims.

I claim:
1. Compounds of the formula:

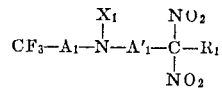

wherein $X_1$ is selected from the group consisting of hydrogen and nitro, $A_1$ and $A'_1$ are lower alkylene radicals, and $R_1$ is selected from the group consisting of nitro and lower alkyl.

2. The compound 1,1,1-trifluoro-5,5,5-trinitro-3-azapentane.

3. The compound 1,1,1-trifluoro-3,5,5,5-tetranitro-3-azapentane.

4. The compound 1,1,1-trifluoro-5,5-dinitro-3-azahexane.

5. The compound 1,1,1-trifluoro-3,5,5-trinitro-3-azahexane.

References Cited

UNITED STATES PATENTS 2,978,507    4/1961    Frankel et al. _____ 260—583
3,000,949    9/1961    Frankel et al. _____ 260—583

CHARLES B. PARKER, Primary Examiner.

R. L. RAYMOND, Assistant Examiner.